United States Patent
Bos

(10) Patent No.: US 9,207,777 B2
(45) Date of Patent: Dec. 8, 2015

(54) ELECTRONIC DEVICE WITH PREDICTIVE URL DOMAIN KEY FUNCTION

(71) Applicant: Research In Motion Limited, Waterloo (CA)

(72) Inventor: Jeffrey Charles Bos, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 365 days.

(21) Appl. No.: 13/665,953

(22) Filed: Nov. 1, 2012

(65) Prior Publication Data

US 2014/0123065 A1    May 1, 2014

(51) Int. Cl.
| | |
|---|---|
| G06F 3/048 | (2013.01) |
| G06F 3/023 | (2006.01) |
| H04M 1/725 | (2006.01) |
| H04L 29/12 | (2006.01) |

(52) U.S. Cl.
CPC ......... G06F 3/0237 (2013.01); H04M 1/72561 (2013.01); *H04L 61/303* (2013.01); *H04L 61/307* (2013.01); *H04M 2250/74* (2013.01)

(58) Field of Classification Search
None
See application file for complete search history.

(56) References Cited

U.S. PATENT DOCUMENTS

| | | | | |
|---|---|---|---|---|
| 5,892,919 | A | * | 4/1999 | Nielsen ......................... 709/228 |
| 5,977,969 | A | * | 11/1999 | DiAngelo ...................... 715/780 |
| 5,978,817 | A | * | 11/1999 | Giannandrea et al. ........ 715/207 |
| 6,045,048 | A | | 4/2000 | Wilz, Sr. et al. |
| 6,068,188 | A | | 5/2000 | Knowles |
| 6,195,707 | B1 | | 2/2001 | Minh |
| 6,707,468 | B2 | | 3/2004 | Tange |
| 6,708,214 | B1 | * | 3/2004 | La Fleur ........................ 709/226 |
| 6,738,827 | B1 | | 5/2004 | Abir |
| 6,996,608 | B2 | | 2/2006 | Smith et al. |
| 7,136,932 | B1 | | 11/2006 | Schneider |
| 7,376,752 | B1 | | 5/2008 | Chudnovsky et al. |
| 7,401,072 | B2 | | 7/2008 | Piscitello et al. |
| 7,698,269 | B2 | | 4/2010 | Zhou et al. |
| 7,817,792 | B2 | | 10/2010 | Chu |
| 7,831,547 | B2 | | 11/2010 | Epling et al. |
| 7,844,909 | B2 | | 11/2010 | Aggarwal et al. |

(Continued)

FOREIGN PATENT DOCUMENTS

WO     0171704     9/2001

OTHER PUBLICATIONS

Extended European Search Report dated Dec. 20, 2012 for European patent application No. 12191002.0.

*Primary Examiner* — Matt Kim
*Assistant Examiner* — Tuan S Nguyen
(74) *Attorney, Agent, or Firm* — Jose Gutman; Fleit Gibbons Gutman Bongini & Bianco P.L.

(57) ABSTRACT

A method, electronic device, processing system, and computer program product, for at least presenting a uniform resource locator (URL) domain extension at a user interface. User input data corresponding to at least a portion of a URL domain is received at the user input interface. A processor concatenates the received user input data into a first character string. The first character string is displayed. The processor predicts a domain URL extension as a second character string that when concatenated with and following the first character string completes at least one of a URL domain and an email address, by comparing the first character string with a set of candidate character strings to find a likely match. The second character string is displayed in visual association with a user input key function of the user input interface.

24 Claims, 8 Drawing Sheets

(56) References Cited

U.S. PATENT DOCUMENTS

| | | |
|---|---|---|
| 7,966,310 B2 | 6/2011 | Sullivan et al. |
| 8,027,974 B2 * | 9/2011 | Gibbs .......................... 707/728 |
| 8,108,404 B2 | 1/2012 | Sylthe et al. |
| 2002/0011839 A1 | 1/2002 | Miyata et al. |
| 2002/0016174 A1 | 2/2002 | Gibson et al. |
| 2002/0118396 A1 * | 8/2002 | Kawai .......................... 358/402 |
| 2003/0014450 A1 | 1/2003 | Hoffman |
| 2004/0003115 A1 | 1/2004 | Mason |
| 2006/0112066 A1 | 5/2006 | Hamzy |
| 2006/0242109 A1 * | 10/2006 | Pereira et al. ..................... 707/1 |
| 2007/0043562 A1 * | 2/2007 | Holsinger et al. ............. 704/231 |
| 2007/0283254 A1 | 12/2007 | Hamzy |
| 2007/0288575 A1 * | 12/2007 | Gillum et al. ................. 709/206 |
| 2008/0126983 A1 * | 5/2008 | Keohane et al. .............. 715/810 |
| 2009/0234851 A1 * | 9/2009 | Fried ................................ 707/6 |
| 2010/0283736 A1 * | 11/2010 | Akabane et al. .............. 345/168 |
| 2011/0029862 A1 * | 2/2011 | Scott et al. .................... 715/261 |
| 2011/0093789 A1 * | 4/2011 | Owens .......................... 715/745 |
| 2012/0223889 A1 * | 9/2012 | Medlock et al. .............. 345/168 |
| 2013/0104068 A1 * | 4/2013 | Murphy et al. ............... 715/773 |

* cited by examiner

ELECTRONIC DEVICE WITH PREDICTIVE URL DOMAIN KEY FUNCTION

FIELD OF THE DISCLOSURE

The present disclosure generally relates to electronic devices that provide user interfaces with uniform resource locator (URL) domain data entry, and more particularly to an electronic device with a URL domain key function.

BACKGROUND

Many different types of electronic devices, such as mobile phones, cellular phones, smartphones, personal computers, laptop personal computers, portable computers, tablet computers, and the like, commonly include browser applications and email applications. While operating with these types of applications the electronic device typically accepts data from a user, such as via typing entered using a keyboard or keypad. The user may identify during data entry, for example, a website or an email address, by using uniform resource locator (URL) domain data in at least a part of the web site domain name or part of the email address, typed into the device.

Users commonly visit websites on different domains requiring different top-level domain extensions when typing URLs using a browser. The default ".com" key on some keyboards is only useful for accessing commercial URLs, e.g., domain names having the top-level domain extension ".com". Users often type the full URL, including the top-level domain extension, every time a website is identified to visit using a browser. In similar fashion, email addresses often include at least a portion of a URL that includes a top-level domain extension. To reduce the tedious typing of all the URL information, some electronic devices allow a user to select a menu item identifying various choices of either entire URLs or domain extensions, to assist in the tedious data entry typing task.

As illustrated in FIG. 1, a conventional user interface 102 includes a keyboard 106 and a data entry display field 104 that are presented to the user of the electronic device. While a user types on individual keys or buttons in the keyboard 106, the character associated with the particular key of the keyboard 106 that is typed by the user is displayed in the entry display field 104. A group of keys 108 in the keyboard 106 can be individually selected by typing on the particular key in the user interface 102. The symbol or numeric 123 key 110 can cause a change of the displayed group of keys 108 to show alternative characters, such as symbols, numbers, or alpha characters in the group of keys 108 as shown in FIG. 1. A space bar 112 is typed to enter a space character as necessary. A period character 114 is available to be entered by typing the corresponding key 114. A return character 116 is entered by typing into the corresponding key 116. Lastly, a fixed top-level domain extension ".com" can be entered by typing the corresponding domain extension key 118. In this way, URL data can be typed by a user by typing in the keyboard 106 which results in the URL data being displayed in the data entry display field 104 in the user interface 102.

If a user wants to enter a domain extension other than ".com", the user may press a button or type on a particular key to cause a pull down menu to display alternative choices of domain names or domain extensions. These choices are typically fixed and/or pre-configured in the device. The user then selects from the menu one of the available choices or the user has to return to the data entry on the keyboard 106 and type the full URL including the domain extension.

Especially in wireless communication devices, such as mobile phones, tablet computers, and the like, where the user interface 102 is particularly small due to the size constraints of the device, the typing of additional characters in a URL, such as a domain extension, adds data entry burden to the user of the device.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
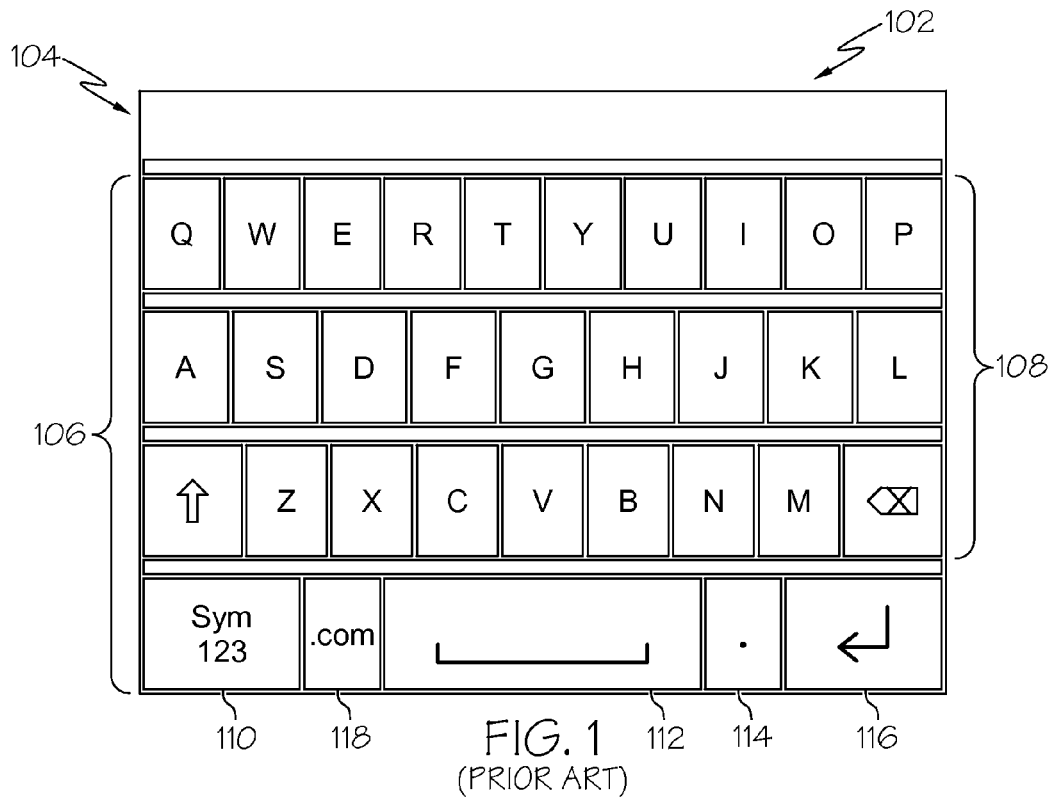
FIG. 1 is a planar view of a prior art user interface with a commercial URL domain extension ".com" key.

As required, detailed embodiments are disclosed herein; however, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function. Further, the terms and phrases used herein are not intended to be limiting, but rather, to provide an understandable description. Additionally, unless otherwise specifically expressed or clearly understood from the context of use, a term as used herein describes the singular or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

The terms "controller", "computer", "server", "client", "computer system", "computing system", "personal computing system", or "processing system" describe examples of a suitably configured processing system adapted to implement one or more embodiments of the present disclosure. Any suitably configured processing system is similarly able to be used by embodiments of the present disclosure, for example and not for limitation, a personal computer, a laptop computer, a tablet computer, a personal digital assistant, a workstation, or the like. A processing system may include one or more processing systems or processors. A processing system can be realized in a centralized fashion in one processing system or in a distributed fashion where different elements are spread across several interconnected processing systems.

The terms "computing system", "computer system", and "personal computing system", describe a processing system that includes a user interface and which is suitably configured and adapted to implement one or more embodiments of the present disclosure. The terms "network", "computer network", "computing network", and "communication network", describe examples of a collection of computers and devices interconnected by communications channels that facilitate communications among users and allows users to share resources. The terms "wireless network", "wireless communication network", and "wireless communication system", similarly describe a network and system that communicatively couples computers and devices primarily or entirely by wireless communication media. The terms "wired network" and "wired communication network" similarly describe a network that communicatively couples computers and devices primarily or entirely by wired communication media.

The term "electronic device" (or alternatively referred to as "communication device" or "electronic communication device") is intended to broadly cover many different types of electronic devices used by persons, and that can receive signals transmitted from other devices or processing systems, and optionally can transmit signals to other devices or processing systems for reception by the other devices or processing systems, to communicate with other devices or processing systems, and may also operate in a communication system. The term "wireless communication device" is intended to broadly cover many different types of communication devices that can wirelessly receive signals, and optionally can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a personal computer, a laptop personal computer, a tablet computer, a personal digital assistant, and other similar communication devices.

The term "portable electronic device" is intended to broadly cover many different types of electronic devices that are portable or that can be transported between locations by a user. For example, and not for any limitation, a portable electronic device can include any one or a combination of the following: a wireless communication device, a laptop personal computer, a notebook computer, a desktop computer, a personal computer, a Personal Digital Assistant, a tablet computer, gaming units, and other handheld electronic devices that can be carried on one's person.

The term "domain URL extension" (or also referred to as "domain extension" or "URL domain extension") is intended to broadly cover many different types of portions of URL domains that individually or in combination with other URL data forms a URL domain. For example, and not for limitation, a domain URL extension may express a top-level domain name portion of a URL domain, such as ".com" for a commercial URL. As a second example, and not for limitation, a domain URL extension completes a domain name, including a top-level domain name portion. For instance, and not for limitation, a domain URL extension may complete a domain name such as with a user having entered an email address portion "username@" an associated domain URL extension could be "rim.com". That is, the complete email address would be "username@rim.com". As a third example, and not for limitation, a domain URL extension may express a completion of a domain name URL including characters at the end of the domain name URL after the top-level domain name extension. For example, and not for limitation, a domain URL extension may complete a domain name URL identifying a path to a file or resource residing inside a server at a domain. For instance, and not for limitation, with a user having entered "http://www.cbc" an associated domain URL extension could be ".rim.com\page.html". That is, the complete URL domain would be "http://www.cbc.rim.com\page.html".

Various embodiments solve problems discussed above by providing electronic devices that include a predictive URL user input key function that provides a user of a particular device with a likely URL domain extension for a one key function data entry of the domain extension for the URL being entered by the user.

Figure 2:
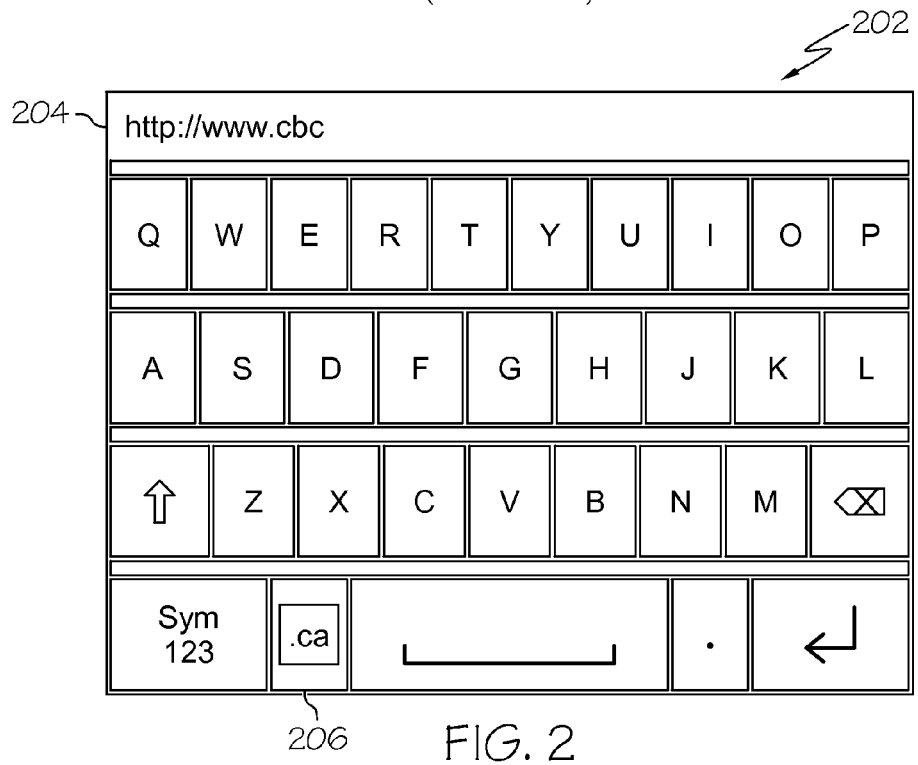
FIG. 2 is a planar view of an example user interface for an electronic device according to the present disclosure.

One example of a keyboard, according to an embodiment of the present disclosure, is illustrated in FIG. 2. The keyboard shown in the example of FIG. 2 is a virtual keyboard (as an alternative to a physical keyboard) with a set of keys (or buttons) that is at least partially displayed on a display. That is, one or more keys of the keyboard are displayed on a display such as a touchscreen display 522 (see FIG. 5). The user interface 202 includes many of the similar elements to those illustrated in FIG. 1. However, while typing on the keyboard of FIG. 2, based on the URL information that has been entered as displayed in the data entry display field (or portion of the display) 204, a domain extension key 206 is dynamically updated to display (e.g., displayed in or as part of the one key 206) a likely domain extension that a user may desire to enter by typing on the domain extension key 206 (i.e., by actuation of the user input key function of the domain extension key 206). It should be noted that when the likely domain extension is displayed as part of the domain extension key 206 the likely domain extension characters are not necessarily displayed inside the domain extension key 206, and they may be displayed in proximity or in visual connection with the domain extension key 206 of a virtual keyboard. As shown in FIG. 2, the domain extension ".ca" is different than the commercial domain extension ".com". When the user types on the domain extension key 206 the characters ".ca" would be added (concatenated) to the end of the URL being displayed in the data entry display field 204.

Figure 3:
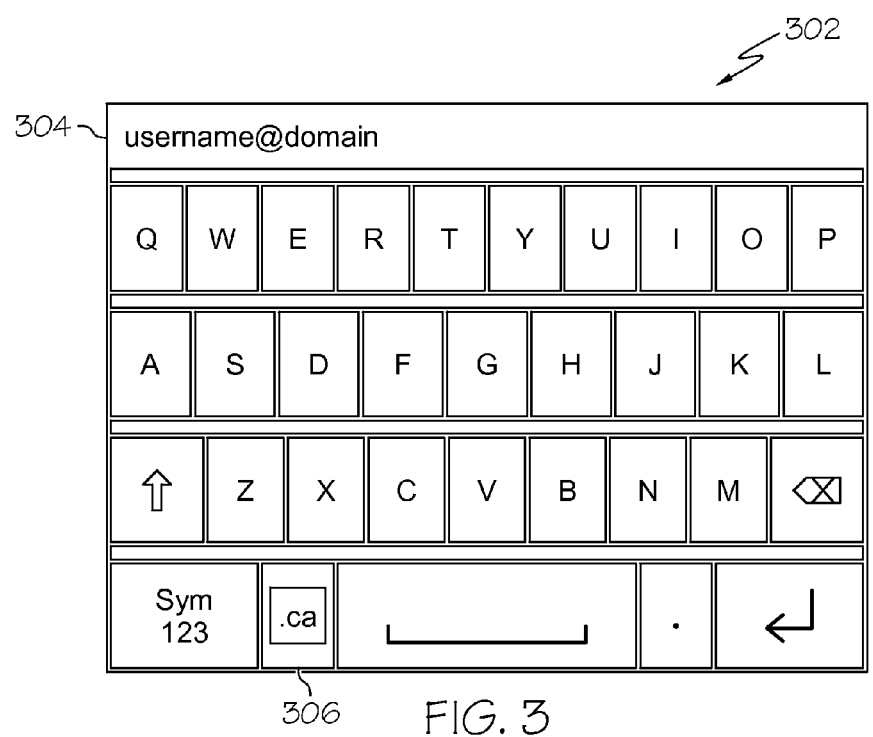
FIG. 3 is a planar view of a second example user interface for an electronic device according to the present disclosure.

While FIG. 2 illustrates an example of a browser user interface 202, in similar fashion FIG. 3 illustrates an example of an email application user interface 302. The data entry display field 304 displays the characters that a user has typed in the keyboard to enter a user's email address. A domain extension key 306 is dynamically updated to provide a likely domain extension that the user will type for a particular email address being entered as displayed in the data entry display field 304. Various alternative embodiments of a new and novel method for a device to dynamically update a domain extension key 206, 306, will be discussed in more detail below.

Figure 4:
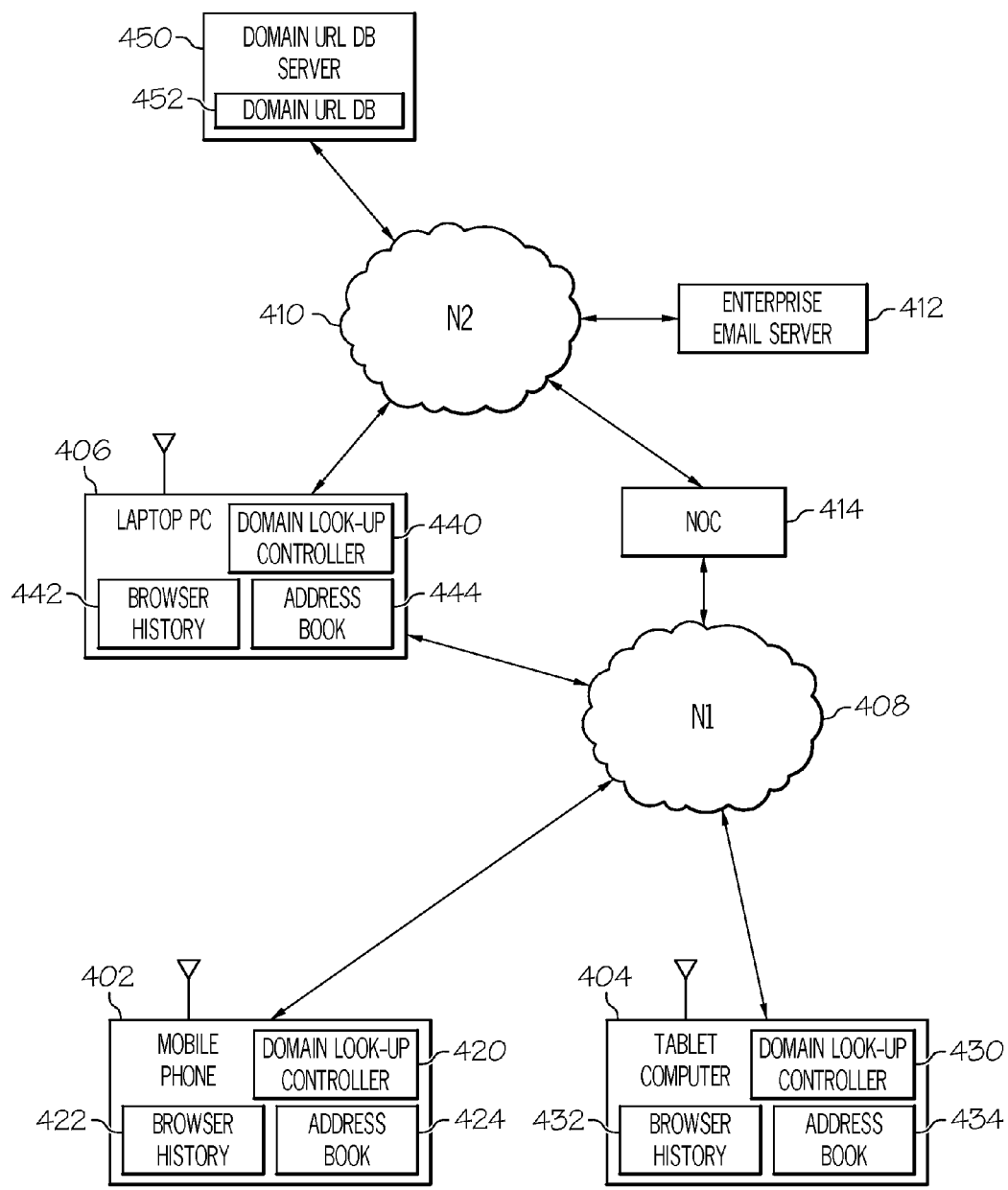
FIG. 4 is a communication block diagram illustrating a communication system environment for use of an electronic device according to the present disclosure.

Referring to FIG. 4, a mobile phone 402, a tablet computer 404, and a laptop PC 406, are shown wirelessly communicatively coupled with a wireless communication network N1 408. Each of these electronic devices 402, 404, 406, according to the present example, includes a domain look-up controller 420, 430, 440, respectively. Also, each of these devices 402, 404, 406, includes at least one browser application that maintains a browser history in a browser history repository 422, 432, 442, respectively. Additionally, each of these devices 402, 404, 406, includes an email application that maintains and uses at least one address book 424, 434, 444, 542, respectively.

According to the example shown in FIG. 4, a second network N2 410 may include one or more local area networks and wide area networks. In the present example, the second network N2 410 comprises a wide area network including the Internet and the world wide web. The second network N2 410 communicatively couples devices such as the laptop PC 406 to other devices or servers that are also communicatively coupled with the second network N2 410. For example, an enterprise email server 412 can receive and send communications via the second network N2 410 to communicate with devices such as the laptop PC 406. This enterprise email server 412, according to various examples, may optionally comprise a private email server system such as provided inside a private company email server system, a private government email server system, a private user email server system, and the like.

A commercial email server (not shown) may be communicatively coupled with the wide area network N2 410. The commercial email server, according to one example, comprises one or more general purpose email server systems, such as provided by commercial email systems such as GMAIL™, HOTMAIL®, or any similar type of commercial email server system available to users via Internet communication.

The laptop PC 406, for example, may request that an email message be sent by the enterprise email server 412. The request is sent from the laptop PC 406 to the enterprise email server 412 via the second network N2 410. The enterprise email server 412, based on the request made by the laptop PC 406, may send an email message to another device as the destination of the email message. For example, a desktop PC (not shown) is communicatively coupled with the second network N2 410 and is a destination of the email message that is sent via the enterprise email server 412. Optionally, an email message may be destined for reception by one or more of the mobile phone 402 and the tablet computer 404. A network operating center (NOC) 414 handles messaging and communications between the second network N2 410 and the wireless communication network N1 408.

The network operating center (NOC) 414 (also referred to as a server system or a server), according to the present example, is communicatively coupled with the wide area network N2 410. The NOC 414 includes one or more information processing systems, memory storage systems, communication interfaces, and administrative and technical personnel user interfaces. The NOC 414 provides control for the one or more wireless communication networks N1 408, and also is a gateway for messaging between the wide area network N2 410 and the wireless communication network N1 408.

The enterprise email server 412 would send an email message through the second network N2 410 and the NOC 414 and the first wireless communication network N1 408 to a destination device such as one or more of the mobile phone 402 and the tablet computer 404. As shown in FIG. 4, the laptop PC 406 may originate an email message via the wireless communication network N1 408 which sends the message to the enterprise email server 412 via the NOC 414 and the second network N2 410. Alternatively, the laptop PC 406, as has been discussed above, may originate an email message directly into the second network N2 and to the enterprise email server 412.

According to various embodiments of the present disclosure, a domain URL data base server 450 is communicatively coupled with the second network N2 410. Of course, it should be understood that a domain URL data base server (not shown) may be communicatively coupled with the first network N1 408. With respect to the present example, the domain URL data base server 450 includes one or more domain URL data bases 452 that hold a collection of domain URLs that are available to provide selectable domain extensions for one or more of the electronic devices 402, 404, 406, that may be communicatively coupled with the domain URL data base server 450. One or more of the electronic devices 402, 404, 406, may be communicatively coupled with the domain URL data server 450 and thereby submit requests for look-ups of likely domain URLs information that can be used by the particular device 402, 404, 406, to assist a user of the device in entering a domain URL extension, as will be discussed in more detail below.

Figure 5:
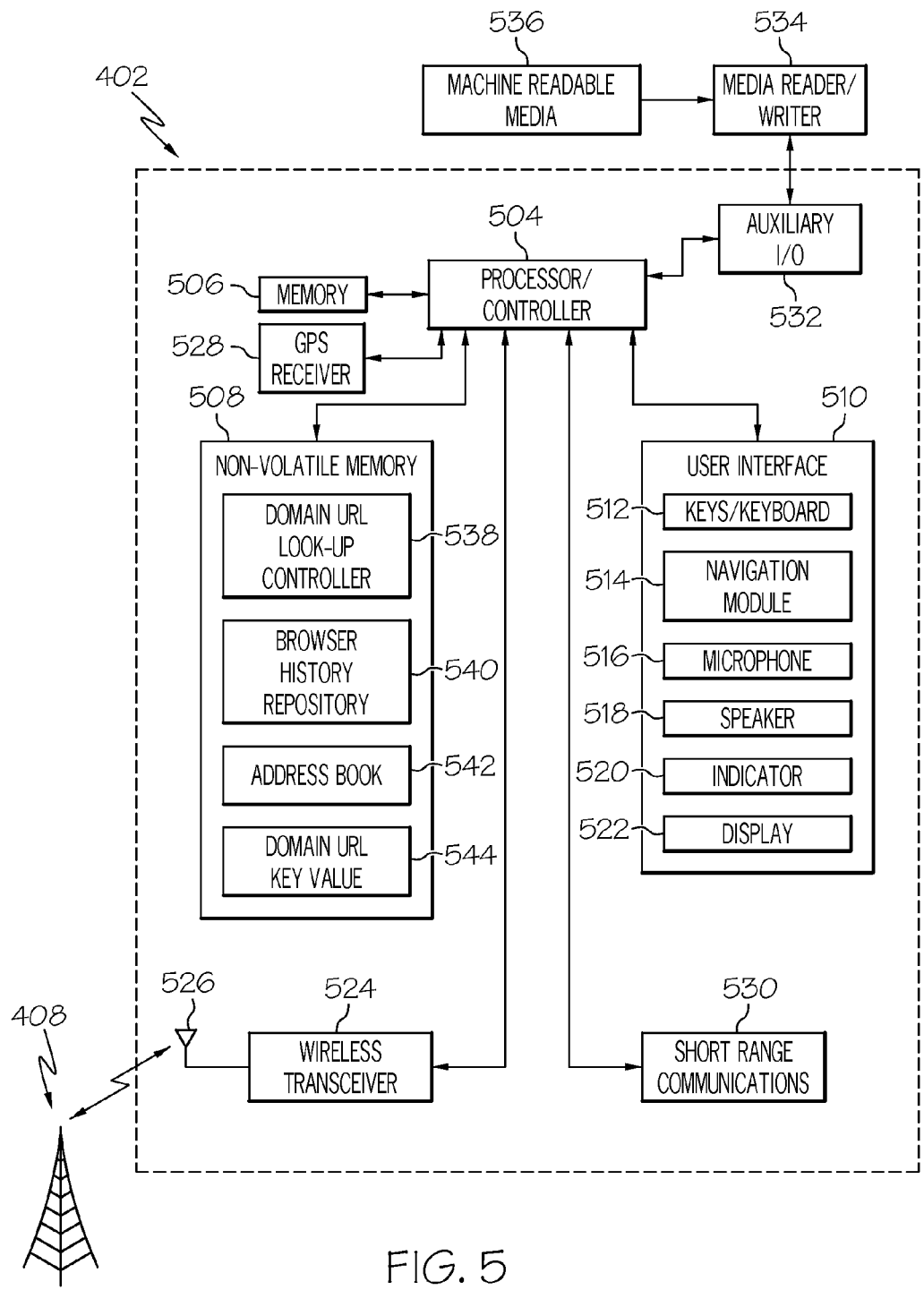
FIG. 5 is a functional block diagram of an example of an electronic device according to the present disclosure.

FIG. 5 shows one example of an electronic device such as a mobile phone device 402 that is communicatively coupled with the wireless communication network 408. While the present discussion is generally directed at a detailed block diagram of the mobile phone device 402, many of the components illustrated in FIG. 5 may be similarly found in other types of electronic devices, such as in a desktop personal computer (not shown), and in the laptop PC 406 and in the tablet computer 404 shown in FIG. 4.

The mobile phone 402 is shown wirelessly communicatively coupled with the one or more wireless communication networks 408. The mobile phone 402 includes at least one processor/controller 504. The processor/controller 504 is communicatively coupled with a memory 506, such as random access memory (RAM). The processor/controller 504 is also coupled with non-volatile memory 508, such as flash memory or battery backed-up RAM, which can, for example, store program and data for the operation of the processor/controller 504.

The processor/controller 504 is communicatively coupled with a user interface 510. The user interface 510 facilitates a user of the device 402 to interact with the device 402. The user interface 510, according to the present example, includes keys, buttons, slide switches, and a keyboard 512. The user interface 510 includes a navigation module 514, such as including a trackball, a touchpad or trackpad, or a navigational pad, which can track finger movement on top of the navigation module 514 to move a pointer or cursor on a display screen. In one example, a keypad may be deployed in combination with a display as a touch screen keypad on the display screen.

A microphone (or microphone input) 516 can receive audio input from a user of the mobile phone 402. A microphone 516 receives audio input from the ambient environment around the microphone 516. The microphone 516 can also accept voice audio input from a user of the device 402. With voice recognition functions operating with the processor 504, the microphone 516 and the processor 504 can receive audible data entry (e.g., speech-to-text conversion) and/or voice commands uttered by a user of the device 402. The data and/or voice commands entered into the device 402 can be processed as user input signals that may include many different types of inputs, including, but not limited to, character data that can be entered as URL data into an application such as a browser, an email client, or a word processor. The microphone 516 operating with the processor 504, according to various embodiments of the present disclosure, can also receive data input and/or voice commands thereby providing actuation of a predictive URL user input key function for the device 402.

In the case when the device 402 comprises a mobile phone (or a smartphone), the microphone 516 can be used as part of a mouth piece of a phone for a user to speak into. The keys/keyboard 512, the navigation module 514, and the microphone 516, are examples of user input devices (e.g., any one or more providing a user input interface) for receiving input from a user.

The user interface 510 includes a speaker 518 that can output audio signals to a user of the mobile phone 402. The mobile phone 402, according to the present example, includes an earpiece speaker 518 that is used to generate output audio to a user engaged in, for example, a telephone call. The microphone 516 can be used as part of a mouth piece of a phone for a user to speak into. The microphone 516 is able to accept audible signals, such as a user's voice, and produce an electrical signal representing the audible signal.

The user interface 510 includes at least one indicator 520. Examples of an indicator include a visual indicator, an audible indicator, and a haptic indicator. A visual indicator may include a lamp, an LED, or an element visible on a display. An audible indicator may include a signal output from a speaker, a buzzer, or other sound emitting device. An example of a haptic indicator includes a vibrating element that provides tactile feedback from the mobile phone 402 to a user.

The user interface 510 includes a display 522 that can display information to the user of the mobile phone 402. There are many types of display technologies that could be implemented as a display 522. For example, the display 522 could be implemented incorporating display technology such as liquid crystal display (LCD) technology, organic light emitting diode (OLED) display technology, and the like. The speaker 518, the at least one indicator 520, and the display 522, are examples of user output devices (e.g., any one or more providing a user output interface) for providing output to a user of the mobile phone 402.

The display 522 depicted in the example of FIG. 5 is a graphical alpha numeric display capable of displaying various images to a user. The display 522, in one example, comprises a touchscreen user input interface device that allows a user to touch the screen of the display 522 to select items and to perform gestures, such as swiping a finger across the screen of the display 522. The touchscreen user input interface can provide a user input interface for an application program operating on the mobile phone 402. In response to a user's gesture(s), such as one finger (or a plurality of fingers), tapping on, or swiping or moving across, the screen of the display 522, the touchscreen user input interface device that is part of the display 522, operating with the processor 504, accepts user input that is associated with the gesture(s) performed by the user. Such user input may include many different types of inputs, including but not limited to characters (e.g., displayable characters) that can be entered as URL data into an application such as a browser, an email client, or a word processor.

Optionally, the mobile phone 402 also includes a trackpad or touchpad (not shown). The trackpad, similar to the touchscreen, is able to accept user input indicating a direction or movement, a magnitude of movement, a velocity of movement, or a combination of these quantities, in response to a user moving a finger or stylus across the outer surface of the trackpad. Similar to the touchscreen user input interface device, the trackpad allows a user to touch the trackpad to select items displayed on the display 522 and to perform gestures, such as swiping a finger across the trackpad. The trackpad can provide a user input interface for an application program operating on the mobile phone 402. Such user input may include many different types of inputs, including but not limited to characters (e.g., displayable characters) that can be entered as URL data into an application such as a browser, an email client, or a word processor.

The mobile phone 402 includes a wireless transceiver 524 (i.e., a long range wireless communication transceiver) that is coupled to the processor/controller 504. The wireless transceiver 524 is coupled to an antenna structure 526 to facilitate wireless communication between the mobile phone 402 and the one or more wireless communication networks 408 and thereby other devices that are also communicatively coupled with the networks 408. Such electronic devices can communicate with a wireless voice or data network via any suitable wireless communication protocol or protocols. The processor/controller 504, in this example, includes at least one digital signal processor (DSP) that performs processing to extract data from received wireless signals and to generate signals to be transmitted.

Data communication with the mobile phone 402 can generally include receiving data, such as a text message or web page download, through the wireless transceiver 524 and providing the received data to the processor 504. The processor 504 is then able to further process the received data for output to the user such as via the display 522 or via other devices such as an auxiliary I/O interface device 532. The mobile phone 402 also allows a user to create data items and content, such as e-mail messages and graphical images, using a user input device such as the keyboard 512 (or other user input device as discussed herein) and possibly in conjunction with use of the display 522, and possibly with data received through an auxiliary I/O interface device 532. Such composed items are then able to be transmitted over a communication network 408 through the wireless transceiver 524.

A global positioning system (GPS) receiver 528 is coupled to the processor/controller 504. The GPS receiver 528 wirelessly receives GPS signals and thereby provides location information for the mobile phone 402 to the processor/controller 504.

The mobile phone 402 includes at least one short range communications device 530 that is communicatively coupled with the processor/controller 504. The short range communications device 530 allows short range wireless communication between the mobile phone 402 and other devices similarly configured with other short range communications devices that are typically (but not necessarily) in proximity to the mobile phone 402. It should be noted that according to various embodiments certain alternatives to the short range communications device 530 may include a short range wireless communication transmitter, a short range wireless communication receiver, or both. According to one example, the short range communications device 530 includes a coil as part of a short range wireless communication interface that facilitates coupling short range wireless communication signals between the mobile phone 402 and another device in proximity. The mobile phone 402 may also comprises a short range communications device 530 that allows communication with other devices via a short range wireless network (not shown) or directly using short range peer-to-peer protocols without the use of a short range wireless network. The short range communications can be based on any short range wireless technology such as, but not limited to, BLUETOOTH®, ZIGBEE®, and Near Field Communication (NFC) technologies.

An auxiliary I/O interface 532 is communicatively coupled with the processor/controller 504 in the mobile phone 402. Through the auxiliary I/O interface 532 the processor/controller 504 is able to communicate information with external devices that are typically tethered with the mobile phone 402. The tethered connection between the mobile phone 402 and an external device can include one or more of the following technologies: wired link, optical data link, power line communication, USB interface communication, and the like. According to one example, input-output data ports in the auxiliary I/O interface 532 are communicatively coupled with the controller 504 and provide interface options between the device 402 and other devices such as via a USB interface that allows communication of information between the device 402 and, for example, a personal computer (such as a desktop personal computer (not shown), or the laptop PC 406 or the tablet computer 404 shown in FIG. 4).

According to the present example, a media reader/writer device 534 is communicatively coupled with the mobile phone 402 via the auxiliary I/O interface 532. The media reader/writer device 534 can include one or more of the following technologies: CD, DVD, floppy drive, optical drive, removable media drive, and the like. Machine readable media 536 can be coupled with the media reader/writer 534 such that the media reader/writer 534 can read information from (and optionally write information to) the machine readable media 536.

An internal power pack, such as a battery (not shown), is connected to a power subsystem to provide power to the circuits of the mobile phone 402. The power subsystem includes power distribution circuitry to supply electric power to the various components of the mobile phone 402 and also includes battery charging circuitry to support recharging the battery. An external power supply (not shown) is able to be connected to the power subsystem. The power subsystem includes a battery monitoring circuit that provide a status of one or more battery conditions, such as remaining capacity, temperature, voltage, current draw, and the like.

Stored in the non-volatile memory 508 are several programs and data that interoperate with the processor/controller 504 to provide features and functions of the mobile phone 402 according to various embodiments of the present disclosure. The non-volatile memory 508 includes a domain URL lookup controller 538, a browser history repository 540 that stores browser history information, at least one address book 542 that stores email address information, and a domain URL key value store 544. These elements of the mobile phone 402 interoperate with the processor/controller 504 according to new and novel methods of the present example embodiment of the disclosure. These elements 538, 540, 542, 544, and the new and novel methods of the present example will be discussed in more detail below.

Operating system software and configuration parameters used by the processor 504 are stored in non-volatile memory 508. In addition to storing operating system software, the non-volatile memory 508 can store other executable programs, configuration parameters, or any combination thereof.

As an example, a computer executable program configured to perform new and novel methods according to the present disclosure can be included in one or more software modules stored in the non-volatile memory 508.

The memory 506 (e.g., RAM memory) is used to store data produced or used by the processor 504. The RAM memory 506 is further able to temporarily store program data from non-volatile memory 508 or from other storage locations. RAM memory 506 is also used to store data received via wireless communication signals or through wired communication.

The processor 504 in some examples executes operating system software as well as various other software applications such as user applications, small, special purpose applications referred to as "apps," and the like. Some software, such as operating system and other basic user functions such as address books 542 are able to be provided as part of the manufacturing process for the electronic device 402.

In addition to loading applications into the device 402 as part of a manufacturing process, applications and/or configuration parameters can be loaded into the device 402 through, for example, the wireless network 408, an auxiliary I/O device 532, a USB port, a short-range communication subsystem 530, or any combination of these interfaces. Once these applications are loaded into the device 402, these applications are executable with the processor 504.

A media reader 534 is able to be connected to the auxiliary I/O device 532 to allow, for example, loading computer readable program code of a computer program product into the device 402 for storage into the non-volatile memory 508. One example of a media reader 534 is an optical drive such as a CD/DVD drive, which may be used to store data to and read data from a computer readable medium or computer storage product comprising computer readable storage media 536. Examples of suitable computer readable storage media include optical storage media such as a CD or DVD, magnetic media, or any other suitable data storage device. The media reader 534 is alternatively able to be connected to the device through a USB port or computer readable program code is alternatively able to be provided to the device 402 through the wireless network 408.

Figure 6:
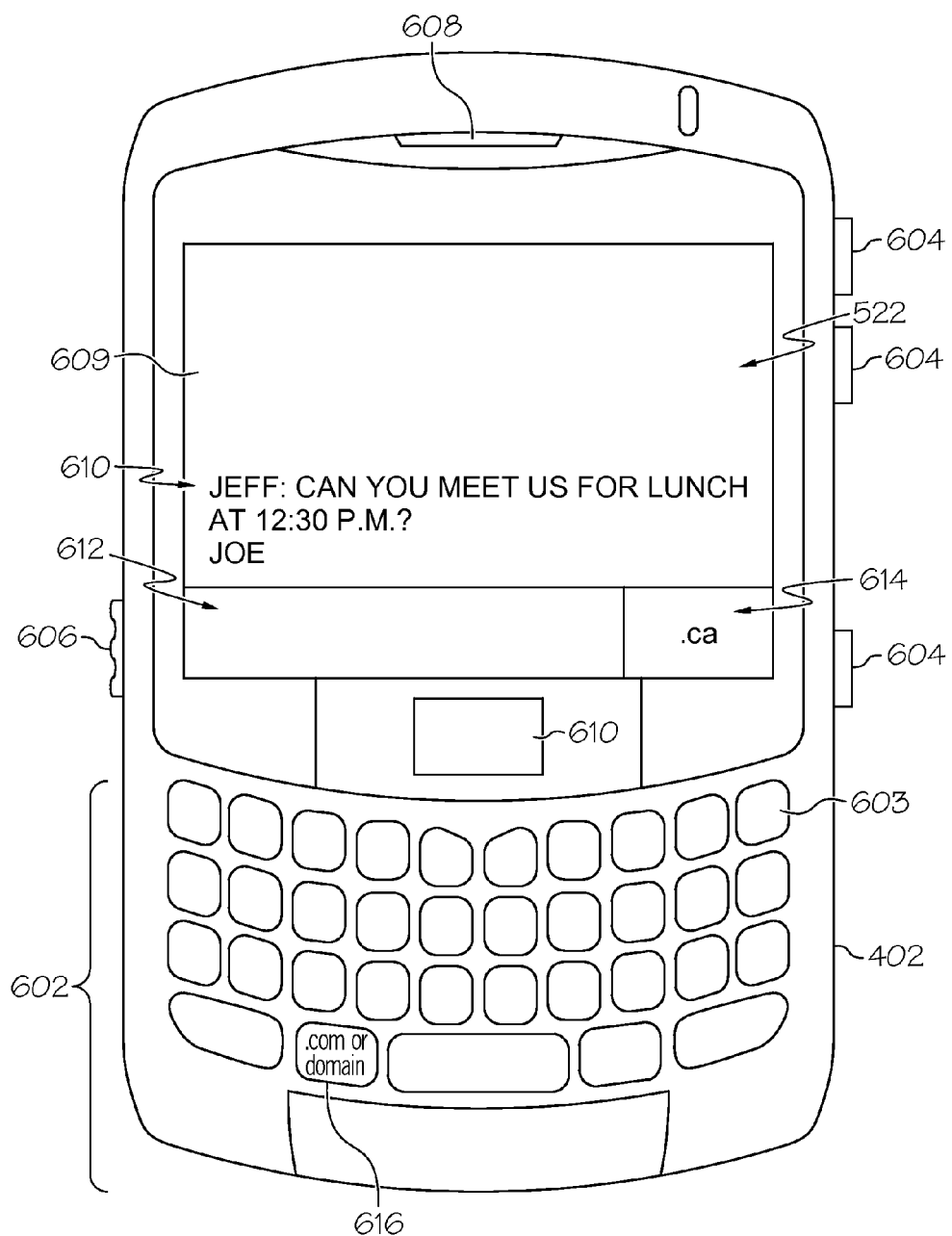
FIG. 6 is a front perspective view of an example of an electronic device illustrating a user interface, according to the present disclosure.

Referring to FIG. 6, one example of a set of user interface elements for the mobile phone 402 is illustrated. A mobile phone 402 includes a keyboard 602 with keys (or buttons) 603 and, in the present example, a domain extension key 616. According to the present example, the domain extension key 616, as shown, may default to a ".com" commercial domain extension or to another predicted domain extension as may be displayed in a domain extension display field (or portion) 614 of a display 522 of the mobile phone 402. The display 522 includes a display portion 609 for displaying information to a user of the device 402. For example, a received message 610 can be displayed to the user in this portion 609 of the display 522.

The mobile phone 402, according to the present example, includes one or more other buttons 604 and slide switch 606 for entering information into the device 402. A speaker 608 is also shown in FIG. 6 to provide audio output to a user of the device 402. For example, the mobile phone 402 can be used by a user to speak and listen during a communication with another person through a wireless communication telephone call. The user of the device 402 would listen to audio via the speaker 608 as an ear-piece of a phone and would speak and enter audio into the device 402 via a microphone (not shown in FIG. 6) as a mouthpiece of a phone.

Additionally, the speaker 608 can provide audible indication to the user of the device 402, such as during entry of information via the keyboard 602 or other user input device. The audible indication signals from the speaker 608 can also provide information to the user of the device 402, such as certain conditions or alerts that are communicated via audible signal through the speaker 608. A navigation module 610 provides an alternative form of user input for the user of the device 402. The user could, for example, slide a finger on the navigation module 610 to enter data (e.g., URL data characters) into the device 402.

The user can type on the keyboard 602 and see the characters that are entered in the device 402 as displayed characters (e.g., a displayed character string) in a portion of the display 612 that shows a data entry field 612, such as while entering a URL. As can be seen in FIG. 6, the domain extension display field (or portion of the display) 614 shows a likely domain extension that the user can select to be entered into the device 402 while entering a URL being displayed in the data entry display field 612. The domain extension displayed in the domain extension display field 614 can be predicted by the device 402 using various alternative novel methods as will be discussed in more detail below. When the user is ready to enter a domain extension, the user has the option of typing the domain extension key 616 to select the predicted likely domain extension shown in the domain extension field 614 on the display 522. For example, when the user types the domain extension key 616, as shown in FIG. 6, the domain extension ".ca" will be entered and shown in the data entry display field 612 which would complete a URL that is being entered by the user of the device 402.

According to various embodiments, after the user types the domain extension key 616 the domain extension is entered and shown in highlighted text characters in the data entry display field 612. For example, these characters may be highlighted in blue or yellow. This allows the user a quick way to manually edit the entered domain extension (and/or the entire URL domain text in the data entry display field 612) in case the user wishes to make changes. This type of editing will typically be much faster than a user having to type the entire URL domain text from scratch. For example, according to one embodiment, if the user decides to change the highlighted characters the user can type a single key (e.g., typing again the domain extension key 616 or possibly typing the space bar key 112) which clears the highlighted characters and leaves the data entry display field cursor displayed at the last character that was entered before typing the domain extension key 616 to enter the predicted domain extension. The user then can manually edit the remaining displayed domain URL characters in the data entry display field 612 or type a different domain extension than the one that was predicted by typing the domain extension key 616, or both. As may be appreciated from the above discussion, in some embodiments, a single key (e.g., the domain extension key 616) being typed causes the predicted domain extension to be alternately displayed with highlighted text characters or cleared from the data entry display field 612.

Figure 7:
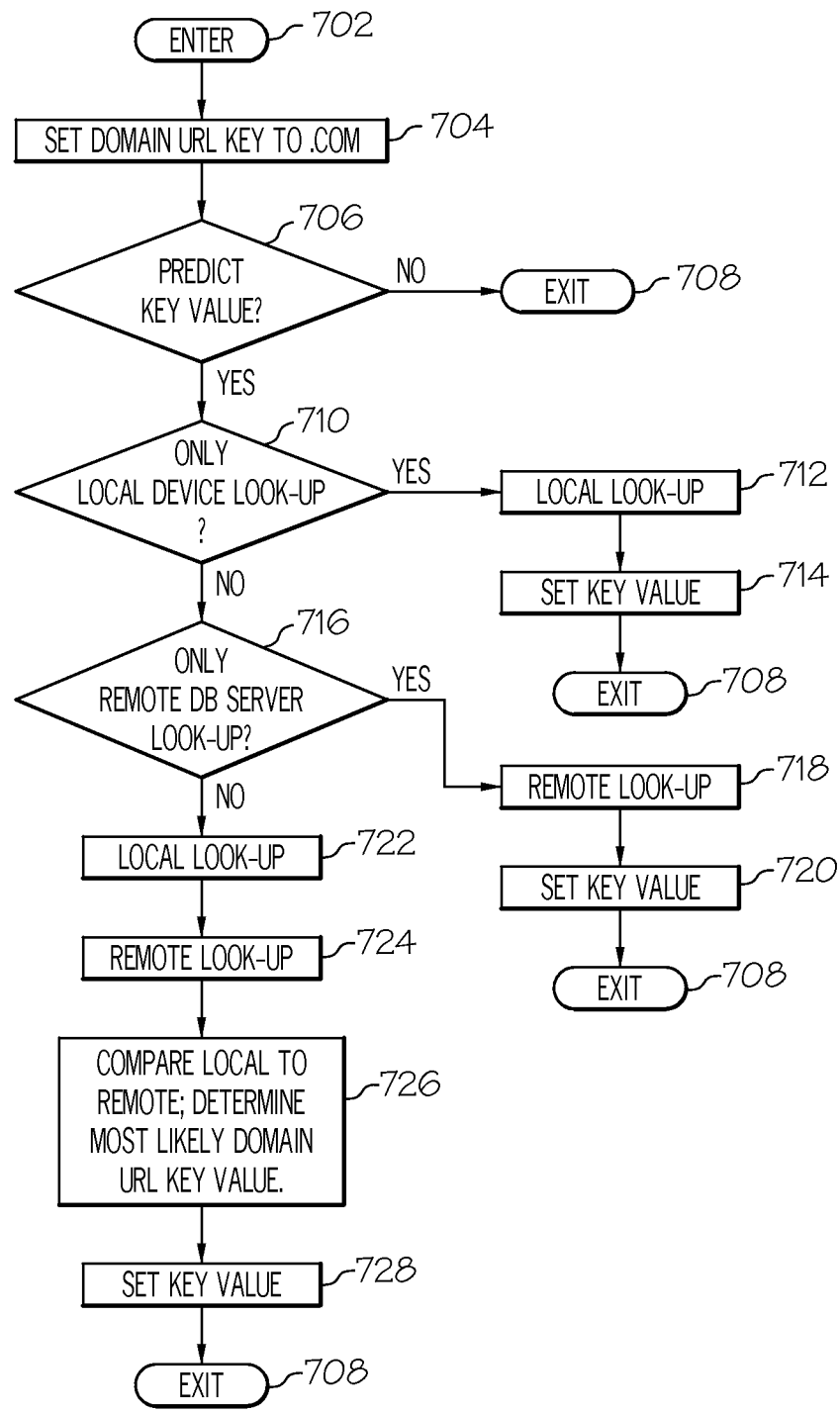
FIGS. 7 to 9 are flow diagrams illustrating various examples of operational flow sequences for an electronic device operating in the communication system environment of FIG. 4, in accordance with the present disclosure.
Figure 8:
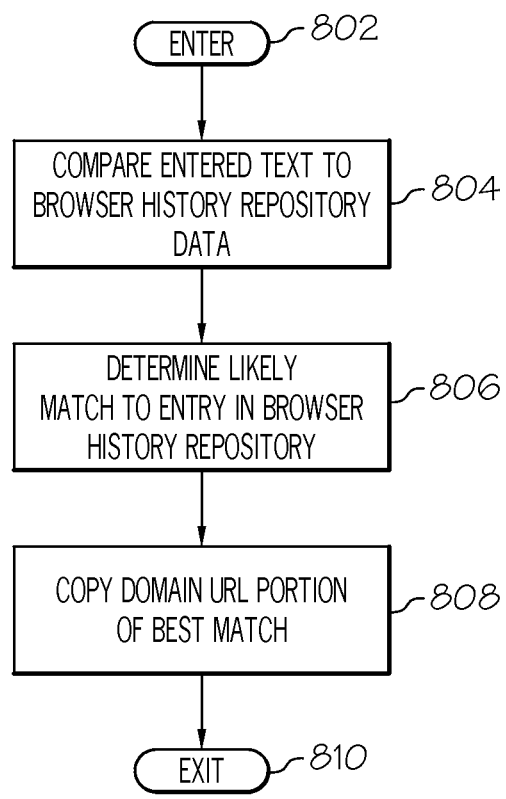
Figure 9:
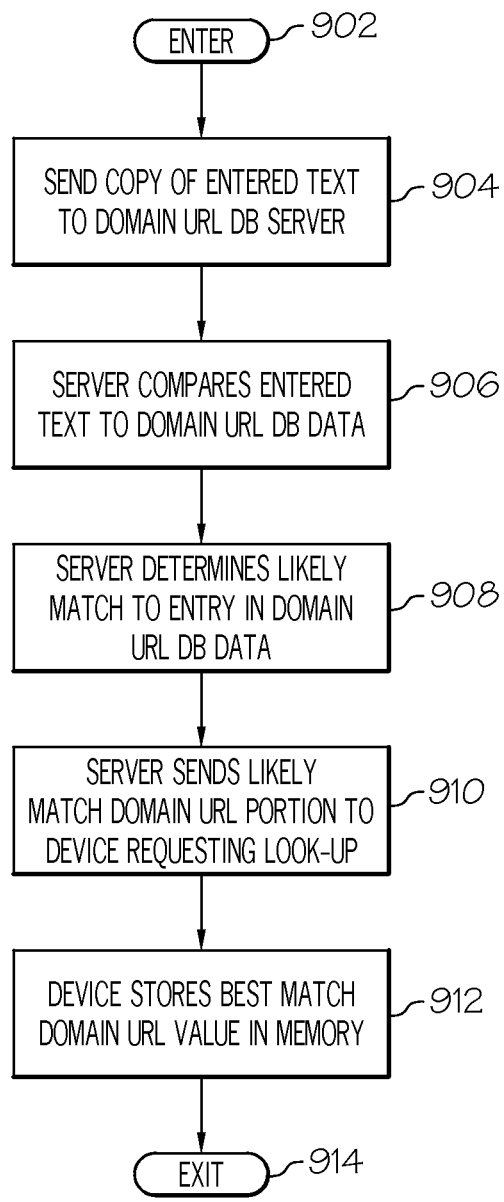

Referring to FIGS. 7, 8, and 9, an operational flow diagram illustrates one example of how an electronic device such as the mobile phone 402 may predict and update dynamically a domain extension for a URL being entered by a user of the device 402. This operational flow diagram may be applicable in various embodiments of the present disclosure.

In one example, it is utilized with a browser application in the device 402 to predict and dynamically set a domain extension associated with a domain extension key 206, 616, that a user can type in a keyboard 602 (a physical keyboard or a virtual keyboard, such as shown in FIG. 2) to enter the domain extension of the URL being entered by the user.

In the example shown in FIG. 6, the domain extension key 616 is a physical key that a user can type in the physical keyboard 602 and in response to pressing the key the dynamically-set domain extension characters are displayed in the domain extension display field 614. In the example shown in FIG. 2, a virtual keyboard (e.g., displayed in a user output interface such as a display touch screen) includes a domain extension key 206 that is dynamically updated with the predicted domain extension characters. A user can type the domain extension key 206 and thereby enter into the device, as displayed in the data entry display field 204, the domain extension of a URL being entered by the user.

The domain extension shown in the domain extension key 206 of the virtual keyboard shown in FIG. 2, dynamically updates its display to show the currently most likely domain extension that the user may desire to enter while typing a URL being displayed in the data entry display field 204. By pressing the domain extension key 206, the displayed characters (e.g. ".ca") are entered into the URL being displayed in the data entry display field 204. The novel methods of FIGS. 7, 8, and 9, may be equally applicable to entering a domain extension portion of an email address being entered by a user of the device 402. For example, as shown in FIG. 3, a virtual keyboard can be displayed on a display 522 and includes a domain extension key 306. The domain extension key 306 is dynamically updated by the device 402 and displays the currently most likely domain extension that a user can enter into an email address being entered and displayed in the data entry display field 304. The keyboard 602 with the domain extension key 616 and the domain extension display field 614 shown in FIG. 6, would be an alternative way for a user interface to display the dynamically set most likely domain extension characters, as displayed in the domain extension display field 614. The user can select the dynamically set domain extension 614 while entering an email address that is being displayed in the data entry display field 612.

Other data entry mechanisms, or a combination of data entry mechanisms, may be used for entering the URL and selecting the domain URL extension. For example, a SWYPE data entry method with a touchscreen display may be used as an alternative, or in addition, to entering URL data into the device 402 using typing function and/or pressing keys. Also, voice input may be used as part of entering URL data into the device 402. All of these data entry mechanisms may be used individually or in any combination while entering URL data into the device, in accordance with alternative embodiments of the present disclosure. Therefore, while the example provided discusses using typing as a mechanism of entering URL data, it is understood that any one or a combination of other data entry mechanisms can be used as well.

Other types of communication applications in electronic devices can utilize the new and novel methods for entering a domain extension as part of a URL (or a URL portion) being entered by a user into the device 402. For example, a word processing application in the device 402 could utilize the new and novel methods as will be discussed below to assist the user in completing a URL being entered as part of a document being edited using the word processing application in the device 402.

It should be noted that various embodiments of the present disclosure reduce the data entry (e.g., typing) burden typically imposed on users of electronic devices, notwithstanding the specific application being operated with an electronic device. Especially where a user interface is very limited in space used for data entry, such as is often the case with mobile phones 402, tablet computers 404, and many types of electronic devices, the user entering data such as by typing on a very small user input interface (e.g., a keypad or keyboard) can be significantly burdened by entering URL information.

Additionally, with reference to FIG. 4, the electronic device (e.g., the mobile phone 402) can communicate with the domain URL data base server 450 to request a look-up in the domain URL data base 452 (e.g., a remote look-up) corresponding to the particular electronic device 402, to predict and dynamically set for a user of the device 402 a domain extension that is the most likely desired by the user to enter a URL (or a URL portion) in the device 402. A request from the mobile phone 402 may be sent to the domain URL data base server 450, for example, while a user of the mobile phone 402 is entering URL data or other related data (e.g., a portion of an email address) by typing in the keyboard of the device 402. The look-up request (e.g., the remote look-up) may be sent to the server 450 at a logical interval detected by the device 402 while the user enters data such as by typing on the keyboard. These look-up requests can be sent as packets from the device 402 to the server 450 and responses can be sent as packets from the server 450 to the device 402 using a network communication protocol, such as using a Transmission Control Protocol/Internet Protocol (TCP/IP) packet communication protocol or another network communication protocol suitable for exchanging packets of information according to the particular network being used in the networked environment of operation of the device 402. For example, a wireless communication protocol may be used for transmitting packets of information between the mobile phone 402 and a domain URL data base server that is wirelessly communicatively coupled with the wireless communication network N1 408.

As an example, while using a browser application at a point of data entry where the user types a delimiter character such as a "/" or other symbol that indicates a logical transition in the description of the entered URL, or indicates an end of URL data entry, the device 402 sends an updated look-up request to the server 450. Alternatively, the device 402 may request a look-up by the domain URL data base server 450 at each progressive character entered of URL data being typed by the user in the device 402. While the user enters each character or alternatively deletes a character, of the URL, the device 402 sends updated requests (e.g., remote look-ups) to the domain URL data base server 450 with the current string of characters entered by the user while typing in the keyboard. It should be noted that other procedures for creating requests and sending the requests (e.g., remote look-ups) from the device 402 to the domain URL data base server 450 are anticipated according to various embodiments of the present disclosure. For example, while the user enters characters by typing on keys of the keyboard in the device 402 these characters are incrementally progressively sent to the domain URL data base server 450 which keeps track of the completed portion of the URL being entered by the user. In this way, only incremental data entry of URL characters would be sent to the domain URL data base server 450 which keeps track of and uses the complete portion of the URL being entered up to the current incremental character to perform look-ups into the domain URL data base 452 to predict a most likely domain extension intended by the user of the device 402 while entering a URL.

The domain URL data base server 450 would attempt a match of the currently entered URL information to one or more URL candidates (URL candidates information) stored in the domain URL data base 452 to attempt a match and thereby predict the most likely domain extension for the current URL data being typed and entered into the device 402 by the user. At each progressive point in the entry of the URL data by the user of the device 402, in response to a request from the device 402, the domain URL data base server 450 sends a most likely domain extension indication message to the mobile phone 402. The domain look-up controller 420, 538 in the mobile phone 402 handles the communication with the domain URL data base server 450 and, according to the present example, receives the most likely domain extension predicted by the domain URL database server 450 and stores it in a domain URL key value store 544 in non-volatile memory 508. According to this example, a remote look-up of a predicted most likely domain extension for the currently entered URL being typed by a user is performed with communication between the domain look-up controller 420, 538 in the device 402 and the domain URL data base server 450.

In similar fashion as discussed above with respect to the browser application, as another example, while using an email client application at a point of data entry where the user types a delimiter character such as an "@" character or other symbol as part of the email address that indicates a logical transition in the description of the entered email information, or indicates an end of email data entry, the device 402 sends an updated look-up request (e.g., a remote look-up) to the server 450. Alternatively, the device 402 may request a look-up by the domain URL data base server 450 at each progressive character entered of email address being typed by the user in the device 402. While the user enters each character or alternatively deletes a character, of the email address, the device 402 sends updated requests to the domain URL data base server 450 with the current string of characters entered by the user while typing in the keyboard. It should be noted that other procedures for creating requests and sending the requests (e.g., the remote look-ups) from the device 402 to the domain URL data base server 450 are anticipated according to various embodiments of the present disclosure. For example, while the user enters characters by typing on the keyboard in the device 402 these characters can be incrementally progressively sent to the domain URL data base server 450 which keeps track of the completed portion of the email address being entered by the user. In this way, only incremental data entry of characters would be sent to the domain URL data base server 450 which keeps track of and uses the complete portion of the email address being entered up to the current incremental character to perform look-ups into the domain URL data base 452 (to attempt to match the email address characters being entered to the email address candidates information stored in the domain URL data base 452) to predict a most likely domain extension intended by the user of the device 402 while entering an email address.

An alternative to the remote look-up just described above, would include a local look-up by the device 402. In a local look-up while using a browser, according to one example, the domain look-up controller 420, 538 of the device 402 takes the currently entered character string of the URL being entered by the user and does a look-up in the browser history repository 422 to attempt to match the currently entered character string to one or more candidate URLs corresponding to browser history information stored in the browser history repository 422. The most likely match found by look-up in the browser history repository 422 would indicate a particular domain extension portion of the matching candidate in the browser history 422. This likely domain extension would be updated and stored in the domain URL key value store 544 by the domain URL look-up controller 420, 538 in the mobile phone device 402. The domain extension stored in the domain URL key value store 544 can be referenced by the browser application and displayed on the display 206, 614, for the user's selection by entering a domain key function in the device 402.

In a local look-up while using an email client, as a second example, the domain look-up controller 420, 538 of the device 402 takes the currently entered character string of the email address being entered by the user and does a look-up in at least one email address book 424, 542 to attempt to match the currently entered character string to one or more candidate email addresses (or email address information) stored in the email address book 424, 542. The most likely match found by look-up in the email address book 424, 542 would indicate a domain extension portion of the matching candidate email address as the most likely domain extension for the email address being entered by the user. This likely domain extension would be updated and stored in the domain URL key value store 544 by the domain URL look-up controller 420, 538 in the mobile phone device 402. The domain extension stored in the domain URL key value store 544 can be referenced by the email client application and displayed on the display 306, 614, for the user's selection by entering a domain key function in the device 402.

As a third alternative example, that is as an alternative to the remote look-up mechanisms and the local look-up mechanisms discussed above, the domain look-up controller 420, 538 may perform a combination of a remote look-up and a local look-up, as will be discussed below.

The remote look-up includes the domain URL look-up controller 420, 538 in the mobile phone device 402 sending one or more requests to the domain URL data base server 450. The responses from the domain URL data base server 450 are used by the domain URL look-up controller 420, 538 as discussed above with respect to the particular application used in the device 402, such as with using a browser application or with using an email client application.

The local look-up includes, in the case of using a browser application, the domain URL look-up controller 420, 538 attempting to locally match the currently entered user input data with candidates stored in the browser history 422, 540. Alternatively, in the case of using an email client application, the local look-up includes the domain URL look-up controller 420, 538 attempting to locally match the currently entered user input data with candidates stored in the address book 424, 542.

The domain URL look-up controller 420, 538 then determines the most likely domain extension to use for the URL (or URL portion) of data being entered in the device 402 by the user. The domain look-up controller 420, 538, for example, may attempt a match of a currently entered URL string to each of the most likely matching URL information received by a response from the domain URL data base server 450 and to the most likely matching candidate URL information matched in the browser history 422. The domain look-up controller 420, 538, thereby determines the best match from the two alternatives, i.e., comparing the most likely URL domain extension from the candidate information received from the server 450 to the most likely URL domain extension from the candidate information resulting from the local look-up matched in the browser history 422. In this way, the domain look-up controller 420, 538, according to the present example, attempts to improve accuracy of prediction of an overall determination of the most likely domain extension for the currently entered URL string being entered by the user.

For example, if the local browser history repository 422 has been recently deleted, the domain look-up controller 422 would benefit in its prediction by using the most likely domain extension indicated from the information received from the domain URL data base server 450. As another example, if the browser history in the browser history repository 422 is very rich and extensive in information while the domain URL data base 452 of the server 452 that corresponds to the device 402 is sparse in information and includes possibly few if any candidate entries, the domain look-up controller 420, 538 may find that the most likely match for a domain extension is best predicted from the information matched in the browser history repository 422. This dual look-up process, therefore, can enhance the overall reliability of the prediction of a most likely domain extension by the domain look-up controller 420, 538 while the user is entering the related data (e.g., URL information, email address information, etc.) into the device 402.

Referring to FIGS. 7, 8, and 9, examples of operational flow sequences for an electronic device, such as the mobile phone 402, will be described below. While these examples are discussed in the context of using a browser application with a mobile phone device 402, in view of the discussions above, it is understood that the examples are similarly applicable to use of other types of applications with the device 402, such as an email client application, a word processing application, and the like. Generally, any device application, or device feature and function, with which a user may enter URL domain information into the device 402 can benefit from use of the new and novel methods described in the present disclosure.

The domain URL look-up controller 420, 538 enters the operational process, at step 702, and proceeds to set the domain URL key value store 544 to ".com", at step 704. The domain URL look-up controller 420, 538 determines, at step 706, whether it is configured to predict the domain extension value associated with the domain extension key, 206, 616. If the domain look-up controller 420, 538 is not configured to predict the domain extension key value, at step 706, then the domain look-up controller 420, 538 exits the operational flow diagram, at step 708. It should be noted that for certain applications, or under certain configurations of an application or of a device 402, the domain look-up controller 420, 538 for the device 402 is not configured to predict the domain extension key value. In such cases, no prediction function is operated by the device 402 and another mechanism is used for entering the URL information. For example, a fixed value, such as ".com" may be assigned to the domain extension key value under certain operational configurations of a device 402 or of an application for operating in the device 402.

Continuing with the present example, if the domain look-up controller 420, 538, at step 706, determines it is configured for predicting the domain extension value, the controller 420, 538 checks whether the prediction is based only on local device look-up, at step 710. This determination by the domain look-up controller 420, 538, for example, may be configured as a parameter in the non-volatile memory 508 of the device 402.

Only Local Look-Up

If the mobile phone 402, in the current example, is configured to only do a local device look-up, at step 710, then the domain URL look-up controller 420, 538 proceeds to do a local look-up at step 712, and then sets the domain extension key value store 544 in the non-volatile memory 408, accordingly. The domain look-up controller 420, 538 then exits the process, at step 708. The local look-up, at step 712, according to one example, is illustrated in FIG. 8. The local look-up, at step 712, is entered, at step 802, and then the domain look-up controller 420, 538 proceeds to compare entered text in the URL, as entered by the user typing on the keyboard, to candidate URL data in the browser history repository 540. The domain look-up controller 420, 538, at step 806, determines the likely match of the entered text string for the URL, as being entered by the user, to each and every entry in the browser history repository 540. The controller 420, 538, at step 808, according to the present example, then copies the domain URL extension portion of the best match URL candidate found in the browser history repository 540 and returns the value, after exiting at step 810. Returning to FIG. 7, the domain extension value returned from the local look-up, at step 712, is then set to the domain URL key value store 544 in the non-volatile memory 508. The domain look-up controller 420, 538 then exits the process, at step 708.

Only Remote Look-Up

If the domain look-up controller 420, 538 determines that, at step 716, only a remote data base server look-up is to be performed, then the domain look-up controller 420, 538 performs the remote look-up, at step 718. As has been described above, the remote look-up includes the domain look-up controller 420, 538 of the device 402 sending a request for remote look-up to the domain URL data base server 450. The domain URL data base server 450 then does a look-up to at least one domain URL data base 452 corresponding to the particular mobile phone 402, and determines a likely match of the URL data being entered by the user at the device 402 to one of the candidate URL values in the domain URL data base 452.

The domain URL data base server 450, according to one example, then sends to the domain look-up controller 420, 538 a message including the likely URL candidate value (or at least including a domain URL extension portion of the candidate value) that the server 450 predicts is being entered by a user as URL data into the mobile phone device 402. In an embodiment where the server 450 message includes the URL candidate value, the domain look-up controller 420, 538 would extract the domain URL extension from the likely match URL candidate value received in the message. Thereafter, the domain look-up controller 420, 538 stores the domain URL extension value in the domain URL key value store 544 in the non-volatile memory 508. In this way, according to the present example, the mobile phone device 402 performs the remote look-up with the assistance of the domain URL data base server 450 to determine a likely domain URL extension for the URL string of characters being entered by the user of the device 402. The domain look-up controller 420, 538, at step 714, sets the domain URL key value store 544 to the determined domain URL extension, and then exits the operational process, at step 708.

Combination of Local Look-Up and Remote Look-Up

If the domain look-up controller 420, 538 determines that it is not configured for only local device look-up, at step 710, and further determines that it is not configured for only remote data base server look-up, at step 716, then it must be configured for a prediction of the domain URL extension based on both the local device look-up and the remote data base server look-up. In this case, at step 722, the domain look-up controller 420, 538 performs the local look-up as has been described above, and, at step 724, performs the remote look-up, as has been described above. The resulting values (in this example each being the likely URL candidate value) determined from the local look-up and from the remote look-up, at step 726, are compared to the URL data being entered by the user. The domain look-up controller 420, 538 then determines which of the local look-up candidate value or the remote look-up candidate value is the best match with the current URL data being entered by the user. The domain look-up controller 420, 538 then stores the most likely domain URL extension value in the domain URL key value store 544 in the non-volatile memory 508. After the domain look-up controller 420, 538, at step 728, sets the domain extension key value store 544 to the most likely value for the domain URL extension, the domain look-up controller 420, 538 exits the operational flow diagram, at step 708.

To perform the remote look-up, at step 718, the domain look-up controller 420, 538 enters, at step 902, the operational flow diagram shown in FIG. 9 and then proceeds to send a copy of the entered URL text to the domain URL data base server 450, at step 906. The server 450 determines the most likely match of the entered URL text to an entry in the domain URL data base 452, at step 908. The server, at step 910, then sends the likely match domain URL to the device 402 requesting the look-up. The domain look-up controller 420, 538 for the device 402, at step 912, stores the received best matched domain URL value in memory, and then exits at step 914, the operational flow diagram. The best matched domain URL value is then returned from the remote look-up, at step 718.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, in certain embodiments of the computer readable medium other than a computer readable storage medium as discussed above, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for presenting a uniform resource locator (URL) domain extension at a user interface of an electronic device, comprising:
    receiving user input data at a user input interface of an electronic device, the user input data corresponding to at least a portion of at least one of a URL domain and an email address;
    concatenating, with at least one processor, the user input data into a first character string of displayable characters;
    displaying the first character string in a data entry display field on a display;
    predicting, with the at least one processor, a domain URL extension as a second character string that when concatenated with and following the first character string completes at least one of a URL domain and an email address, the at least one processor predicting the domain URL extension by comparing the first character string with each of a set of candidate character strings to find a match between the first character string and at least a portion of a candidate character string in the set of candidate character strings; and
    displaying, based on the predicting, the second character string in a display field separate from the data entry display field, the second character string being visually separate from the first character string on the display, and the second character string being in visual association with a user input key function of the user input interface of the electronic device; and wherein the predicting comprises predicting a domain URL extension as a second character string that when concatenated with and following the first character string completes a URL domain, based on
        requesting a remote look-up of URL candidates information by sending a request for look-up to a domain URL data base server to look-up URL candidates information stored in a domain URL data base to find a match between the first character string and at least a portion of one of the URL candidates information stored in the domain URL data base, the domain URL data base server and domain URL data base being remotely located to the electronic device;
        receiving a response to the requested remote look-up, comprising found URL candidate information from the domain URL data base;
        performing a local look-up of browser history information in a browser history repository of the electronic device to find a match between the first character string and at least a portion of one of the URL candidates information stored in the browser history repository;
        determining, based on the look-up, found URL candidate information from the browser history information in the browser history repository; and
        determining a domain URL extension as the predicted second character string by
            comparing the first character string to each of the found URL candidate information from the domain URL data base and the found URL candidate information from the browser history information to find a match between the first character string and at least a portion of one of the two found URL candidate information; and
            determining the domain URL extension as the predicted second character string that when concatenated with and following the first character string completes a URL domain comprising one of the two found URL candidate information with at least a portion matching the first character string.

2. The method of claim 1, wherein the receiving user input data at a user input interface of an electronic device comprises at least one of
    receiving characters typed at a virtual keyboard of the electronic device;
    receiving characters typed at a physical keyboard of the electronic device; and
    receiving character data from audible data entry uttered into a microphone input of the electronic device.

3. The method of claim 1, wherein displaying the second character string in visual association with a user input key function comprises at least one of:
    displaying the second character string as part of one key of a virtual keyboard displayed on a display of the electronic device;
    displaying the second character string in a portion of a display of the electronic device, the portion of the display being visually associated with one button of the electronic device;
    displaying the second character string in a portion of a display of the electronic device, the portion of the display being visually associated with one key of a keyboard of the electronic device; and
    displaying the second character string in a portion of a display of the electronic device, the portion of the display being visually associated with a user input key function corresponding to receiving audible data entry uttered into a microphone input of the electronic device.

4. The method of claim 1, wherein displaying the second character string in visual association with a user input key function comprises displaying the second character string in one key of a virtual keyboard displayed on a display of the electronic device.

5. The method of claim 1, wherein the predicting comprises predicting a domain URL extension as a second character string that when concatenated with and following the first character string completes a URL domain, and wherein displaying the second character string in visual association with a user input key function of the user input interface comprises displaying the second character string in one key of a virtual keyboard being displayed in connection with a browser application executing in the electronic device.

6. The method of claim 1, wherein the predicting comprises predicting a domain URL extension as a second character string that when concatenated with and following the first character string completes an email address, and wherein displaying the second character string in visual association with a user input key function of the user input interface comprises displaying the second character string in one key of a virtual keyboard being displayed in connection with an email client application executing in the electronic device.

7. The method of claim 1, wherein the predicting comprises predicting a domain URL extension as a second character string that when concatenated with and following the first character string completes a URL domain, based on at least a look-up of browser history information in a browser history repository of the electronic device.

8. The method of claim 1, wherein the predicting comprises predicting a domain URL extension as a second character string that when concatenated with and following the first character string completes an email address, based on at least a look-up of email address information stored in at least one address book of the electronic device.

9. The method of claim 1, wherein the predicting comprises predicting a domain URL extension as a second character string that when concatenated with and following the first character string completes a URL domain, based on at least a remote look-up of URL candidates information by sending a request for look-up to a domain URL data base server to look-up URL candidates information stored in a domain URL data base, the domain URL data base server and domain URL data base being remotely located to the electronic device.

10. The method of claim 1, wherein the predicting comprises predicting a domain URL extension as a second character string that when concatenated with and following the first character string completes an email address, based on at least a remote look-up of email address information by sending a request for look-up to a domain URL data base server to look-up email address candidates information stored in a domain URL data base, the domain URL data base server and domain URL data base being remotely located to the electronic device.

11. The method of claim 1, further comprising
receiving actuation of the user input key function of the user input interface; and
displaying, in response to receiving actuation of the user input key function, the second character string, concatenated with and following the first character string, on the display.

12. The method of claim 11, wherein the receiving actuation of the user input key function of the user input interface comprises at least one of:
receiving a typed key actuation at a virtual keyboard of the electronic device;
receiving a typed key actuation at a physical keyboard of the electronic device; and
receiving character data from audible data entry uttered into a microphone input of the electronic device.

13. The method of claim 1, wherein the electronic device comprises a wireless communication device including at least one of: a two-way radio, a cellular telephone, a mobile phone, a smartphone, a two-way pager, a wireless messaging device, a personal computer, a laptop personal computer, a tablet computer, and a personal digital assistant.

14. A processing system comprising:
a display;
a user input interface including a user input key function;
memory;
a processor/controller, communicatively coupled with the display, the user input interface, and the memory;
a domain URL look-up controller, communicatively coupled with the processor/controller and the memory, the domain URL look-up controller being configured to
receive user input data at the user input interface, the user input data corresponding to at least a portion of at least one of a URL domain and an email address;
concatenate, with the processor/controller, the user input data into a first character string of displayable characters;
display the first character string in a data entry display field on the display;
predict, with the processor/controller, a domain URL extension as a second character string that when concatenated with and following the first character string completes at least one of a URL domain and an email address, the predicting being performed by comparing the first character string with each of a set of candidate character strings to find a match between the first character string and at least a portion of a candidate character string in the set of candidate character strings; and
display, based on the predicting, the second character string in a display field separate from the data entry display field, the second character string being visually separate from the first character string on the display, and the second character string being in visual association with the user input key function of the user input interface; and wherein the predicting comprises predicting a domain URL extension as a second character string that when concatenated with and following the first character string completes a URL domain, based on
requesting a remote look-up of URL candidates information by sending a request for look-up to a domain URL data base server to look-up URL candidates information stored in a domain URL data base to find a match between the first character string and at least a portion of one of the URL candidates information stored in the domain URL data base, the domain URL data base server and domain URL data base being remotely located to the electronic device;
receiving a response to the requested remote look-up, comprising found URL candidate information from the domain URL data base;
performing a local look-up of browser history information in a browser history repository of the electronic device to find a match between the first character string and at least a portion of one of the URL candidates information stored in the browser history repository;
determining, based on the look-up, found URL candidate information from the browser history information in the browser history repository; and
determining a domain URL extension as the predicted second character string by
comparing the first character string to each of the found URL candidate information from the domain URL data base and the found URL candidate information from the browser history information to find a match between the first character string and at least a portion of one of the two found URL candidate information; and
determining the domain URL extension as the predicted second character string that when concatenated with and following the first character string completes a URL domain comprising one of the two found URL candidate information with at least a portion matching the first character string.

15. The processing system of claim 14, the domain URL look-up controller being further configured to
receive actuation of the user input key function of the user input interface; and
display, in response to receiving actuation of the user input key function, the second character string, concatenated with and following the first character string, on the display of the processing system.

16. The processing system of claim 14, wherein the user input interface comprises a virtual keyboard and the user input key function of the user input interface comprises one key of the virtual keyboard, and wherein the domain URL look-up controller is further configured to
receive user input data at the user input interface by receiving characters typed at the virtual keyboard, the user input data corresponding to at least a portion of a URL domain; and display the second character string in visual association with the user input key function of the user input interface by displaying the second character string as part of the one key of the virtual keyboard.

17. The processing system of claim 14, wherein the user input interface comprises a physical keyboard and the user input key function of the user input interface comprises one key of the physical keyboard, and wherein the domain URL look-up controller is further configured to
  receive user input data at the user input interface by receiving characters typed at the physical keyboard, the user input data corresponding to at least a portion of a URL domain; and
  display the second character string in visual association with the user input key function of the user input interface by displaying the second character string in a portion of a display of the processing system, the portion of the display being visually associated with the one key of the physical keyboard.

18. The processing system of claim 14, wherein the user input interface comprises a microphone input, and wherein the user input key function of the user input interface comprises receiving audible data entry uttered into the microphone input, and wherein the domain URL look-up controller is further configured to
  display the second character string in visual association with the user input key function of the user input interface by displaying the second character string in a portion of a display of the processing system, the portion of the display being visually associated with the user input key function corresponding to receiving audible data entry uttered into the microphone input.

19. The processing system of claim 14, further comprising a browser application and a browser history repository that is at least partially stored in the memory, and wherein the domain URL look-up controller being further configured to
  predict a domain URL extension as a second character string that when concatenated with and following the first character string completes a URL domain, based on at least performing a look-up of browser history information in the browser history repository.

20. The processing system of claim 14, further comprising an email client application and at least one email address book that is at least partially stored in the memory, and wherein the domain URL look-up controller being further configured to
  predict a domain URL extension as a second character string that when concatenated with and following the first character string completes an email address, based on at least performing a look-up of email address information stored in the at least one address book.

21. The processing system of claim 14, wherein the processing system comprises an electronic device with a wireless transceiver communicatively coupled with the processor/controller, and wherein the domain URL look-up controller predicts, with the processor/controller, the domain URL extension by predicting the domain URL extension as a second character string that when concatenated with and following the first character string completes a URL domain, based on at least a remote look-up of URL candidates information by sending, with the wireless transceiver, a request for look-up to a domain URL data base server to look-up URL candidates information stored in a domain URL data base, the domain URL data base server and domain URL data base being remotely located to the electronic device.

22. The processing system of claim 14, wherein the processing system comprises an electronic device with a wireless transceiver communicatively coupled with the processor/controller, and wherein the domain URL look-up controller predicts, with the processor/controller, the domain URL extension by predicting the domain URL extension as a second character string that when concatenated with and following the first character string completes an email address, based on at least a remote look-up of email address information by sending, with the wireless transceiver, a request for look-up to a domain URL data base server to look-up email address candidates information stored in a domain URL data base, the domain URL data base server and domain URL data base being remotely located to the electronic device.

23. A computer program product for at least presenting a uniform resource locator (URL) domain extension at a user interface of an electronic device, the computer program product comprising:
  a computer readable storage medium having computer readable program code embodied therewith, the computer readable program code comprising instructions for performing a method comprising:
    receiving user input data at a user input interface of an electronic device, the user input data corresponding to at least a portion of at least one of a URL domain and an email address;
    concatenating, with at least one processor, the user input data into a first character string of displayable characters;
    displaying the first character string in a data entry display field on a display;
    predicting, with the at least one processor, a domain URL extension as a second character string that when concatenated with and following the first character string completes at least one of a URL domain and an email address, the at least one processor predicting the domain URL extension by comparing the first character string with each of a set of candidate character strings to find a match between the first character string and at least a portion of a candidate character string in the set of candidate character strings; and
    displaying, based on the predicting, the second character string in a display field separate from the data entry display field, the second character string being visually separate from the first character string on the display, and the second character string being in visual association with a user input key function of the user input interface of the electronic device; and
    wherein the predicting comprises predicting a domain URL extension as a second character string that when concatenated with and following the first character string completes a URL domain, based on
    requesting a remote look-up of URL candidates information by sending a request for look-up to a domain URL data base server to look-up URL candidates information stored in a domain URL data base to find a match between the first character string and at least a portion of one of the URL candidates information stored in the domain URL data base, the domain URL data base server and domain URL data base being remotely located to the electronic device;
    receiving a response to the requested remote look-up, comprising found URL candidate information from the domain URL data base;
    performing a local look-up of browser history information in a browser history repository of the electronic device to find a match between the first character string and at least a portion of one of the URL candidates information stored in the browser history repository;

determining, based on the look-up, found URL candidate information from the browser history information in the browser history repository; and determining a domain URL extension as the predicted second character string by comparing the first character string to each of the found URL candidate information from the domain URL data base and the found URL candidate information from the browser history information to find a match between the first character string and at least a portion of one of the two found URL candidate information; and determining the domain URL extension as the predicted second character string that when concatenated with and following the first character string completes a URL domain comprising one of the two found URL candidate information with at least a portion matching the first character string.

24. The computer program product of claim 23, wherein displaying the second character string in visual association with a user input key function comprises at least one of:

displaying the second character string as part of one key of a virtual keyboard displayed on a display of the electronic device;

displaying the second character string in a portion of a display of the electronic device, the portion of the display being visually associated with one button of the electronic device;

displaying the second character string in a portion of a display of the electronic device, the portion of the display being visually associated with one key of a keyboard of the electronic device; and displaying the second character string in a portion of a display of the electronic device, the portion of the display being visually associated with a user input key function corresponding to receiving audible data entry uttered into a microphone input of the electronic device.

* * * * *